United States Patent
Liu et al.

(10) Patent No.: US 12,319,768 B2
(45) Date of Patent: Jun. 3, 2025

(54) DARK-COLORED SYSTEM PHOTOPOLYMERIZED COMPOSITION

(71) Applicant: JIANGNAN UNIVERSITY, Jiangsu (CN)

(72) Inventors: Ren Liu, Jiangsu (CN); Xiucheng Zou, Jiangsu (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 515 days.

(21) Appl. No.: 17/604,270

(22) PCT Filed: Oct. 17, 2019

(86) PCT No.: PCT/CN2019/111547
§ 371 (c)(1),
(2) Date: Oct. 15, 2021

(87) PCT Pub. No.: WO2021/068275
PCT Pub. Date: Apr. 15, 2021

(65) Prior Publication Data
US 2022/0220244 A1 Jul. 14, 2022

(30) Foreign Application Priority Data
Oct. 8, 2019 (CN) .......................... 201910949770.3

(51) Int. Cl.
*C08F 283/00* (2006.01)
*C08F 2/48* (2006.01)
*C08K 3/04* (2006.01)
*C08K 5/3417* (2006.01)

(52) U.S. Cl.
CPC ............ *C08F 283/008* (2013.01); *C08F 2/48* (2013.01); *C08K 3/04* (2013.01); *C08K 5/3417* (2013.01)

(58) Field of Classification Search
CPC ...... C08F 283/008; C08F 2/48; C08F 283/10; C08F 290/064; C08F 290/067; C08F 283/00; C08K 3/04; C08K 5/3417; C08K 3/16; C08K 5/56; C09D 175/14
See application file for complete search history.

(56) References Cited

U.S. PATENT DOCUMENTS

| 5,112,883 A * | 5/1992 | Gallas .................... G02B 1/105 252/588 |
| 2016/0331868 A1* | 11/2016 | Grubbs ..................... A61F 9/00 |

OTHER PUBLICATIONS

Gou et al., Machine English translation of CN109232776 (Year: 2019).*

* cited by examiner

*Primary Examiner* — Jessica M Roswell
(74) *Attorney, Agent, or Firm* — HAUPTMAN HAM, LLP

(57) ABSTRACT

A dark-colored system photopolymerization composition, comprising: 20-80 phr of photopolymerizable prepolymer, 5-60 phr of photopolymerizable monomer, 0.2-8 phr of photoinitiator, and 0.1-5 phr of melanin, 0.05-5 phr of upconversion materials. The composition can construct photopolymerization under near-infrared irradiation. The dark pigment can avoid the strong absorption of near-infrared light, and the upconversion material can absorb near-infrared light with good penetrating ability and emit ultraviolet or visible light to induce the decomposition of free radicals or ionic photoinitiators in the composition. Then produced active species realize the photopolymerization of dark-colored compositions. The invention increases the depth of photopolymerization of dark-colored compositions and improves the mechanical properties of the polymer, that will broaden application fields of photopolymerization materials.

9 Claims, 2 Drawing Sheets

DARK-COLORED SYSTEM PHOTOPOLYMERIZED COMPOSITION

RELATED APPLICATION

This is a U.S. national stage of international application No. PCT/CN2019/111547 filed on Oct. 17, 2019, which claims priority from China Patent Application No. 201910949770.3 filed on Oct. 8, 2019, the entire content of which is incorporated by reference.

BACKGROUND OF THE INVENTION

1. Field of the Invention

The invention relates to the technical field of photopolymer materials, in particular to a dark-colored photosensitive composition.

2. Description of the Related Art

At present, the polymerization of dark-colored system is mainly realized by thermal polymerization, which needs thermal drying treatment and decrease efficiency of the curing. As a green technology with high efficiency and environmental protection, UV curing technology has developed rapidly in recent years. However, at present, the maximum absorption wavelength of commercial photoinitiators is short (mostly less than 500 nm), and the penetration ability of this band of light in the resin system is limited. Coupled with the introduction of pigments, fillers and functional materials, especially the black pigment system, the light cannot be penetrated to induce photopolymerization, which limits the application of photocuring technology in dark-colored system.

Therefore, it is necessary to develop a dark-colored photosensitive system which can be efficiently cured by light.

SUMMARY OF THE INVENTION

The purpose of the present invention is to solve the problem of photopolymerization of dark color system. A dark-colored photosensitive composition was obtained and its technical scheme of is as follows:

The components and mass parts of each component contained in a dark-colored photopolymerization composition are:

Photopolymerizable prepolymer 20-80 phr;
Photopolymerizable monomer 5-60 phr;
Photoinitiator 2-8 phr;
Dark pigment 1-5 phr;
Upconversion materials 0.05-5 phr.

In one embodiment, the photopolymerizable prepolymer and/or the photopolymerizable monomer have polar groups including hydroxyl groups or amino groups.

The photopolymerizable prepolymer and/or photopolymerizable monomer with polar group can significantly improve the dispersion effect of dark pigments, increase the force between prepolymer/monomer and dark pigment, and improve the mechanical properties of the material.

In one embodiment, the photopolymerizable prepolymer includes one or more of polyurethane acrylate, epoxy acrylate, polyester acrylate, amino acrylate, epoxy resin and vinyl resin; It is preferably one or more of polyurethane acrylate, epoxy acrylate and epoxy resin.

In one embodiment, the photopolymerizable monomers include one or more of monofunctional acrylate monomers, difunctional acrylate monomers, multifunctional acrylate monomers, ester ring epoxy monomers, oxetane monomers; It is preferably one or more of isobornyl acrylate, neopentyl glycol diacrylate, dipentaerythritol hexaacrylate, 1-vinyl-2-pyrrolidone, tetrahydrofuran acrylate, o-benzene phenoxyethyl acrylate, 1,6-hexanediol diacrylate, trimethylolpropane triacrylate, pentaerythritol triacrylate, 3,4-epoxycyclohexylmethyl-3,4-epoxycyclohexyl formate.

In one embodiment, the upconversion material includes one or more of $NaYF_4$, $BaYF_5$, $NaGdF_4$, $LiYF_4$, $NaYbF_4$, $Na_3ScF_6$, $YF_3$, GdOF.

In one embodiment, the dark pigment includes natural melanin.

In one embodiment, the dark pigment comprises a substance having the following structure:

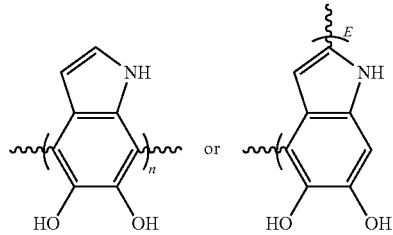

Where n ranges from 50 to 400; The range of m is 50-400.

In one embodiment, the dark pigment is prepared by oxidation of 4-(2-aminoethyl)-1,2-dihydroxyphenol hydrochloride.

In one embodiment, the photoinitiator includes one or more of 2,4,6-trimethylbenzoyldiphenylphosphine oxide, 1-hydroxycyclohexylphenyl ketone, 2,4,6-trimethylbenzoylphenyl phosphonate ethyl ester, bis(2,6-difluoro-3-pyrrolylphenyl) titanocene, phenyl bis(2,4,6-trimethylbenzoyl) phosphine oxide, 2-isopropylthioxanthone, 2-hydroxy-2-methyl-1-phenylacetone, 2-methyl-2-(4-morpholinylphenyl)-1-[4-(methylthio)phenyl]-1-acetone, 1,4,6-trimethylbenzoyldiphenylphosphine oxide, 2-hydroxy-2-methyl-2-2-(4-morpholinylphenyl)-1-[4-(methylthio)phenyl]-1-acetone, 7,7'-trimethylbicyclo(2,2,1)heptane-1,3-dione, methyldiphenyl sulfonium tetrafluoroborate, 4,4'-dimethyldiphenyliodonium hexafluorophosphate; It is preferably one or more of 2,4,6-trimethylbenzoyldiphenylphosphine oxide, bis (2,6-difluoro-3-pyrrolidine) titanocene, 4,4'-dimethyldiphenyliodonium salt hexafluorophosphate.

Another object of the present invention is to provide the application of the aforementioned dark-colored system photopolymerization composition, which undergoes photopolymerization under near-infrared light irradiation to form a dark-colored crosslinked polymer.

In one embodiment, the curing depth of the dark crosslinked polymer is 0.01-30 mm.

In one embodiment, the wavelength of the near-infrared light is 800-1100 nm; The energy density of the near-infrared light is greater than 1 $W/cm^2$ and less than 20 $W/cm^2$.

THE ADVANTAGES OF THE INVENTION ARE

The present invention uses dark pigments to replace the traditional carbon black fillers in the black resin system. A certain concentration and proportion of upconversion materials, dark pigments, and photoinitiators are added to the photopolymerization system. Under the irradiation of near-infrared light, the maximum curing depth of the dark system can reach the centimeter level. The simple and efficient method breaks through the difficult problem of traditional photopolymerization in dark systems, broadens the application field of photopolymerization technology, which is suitable for dark photocurable coatings, photocurable composite materials and other technical fields.

The dark pigment used in the present invention can avoid the absorption of near-infrared light, and the upconversion material can absorb near-infrared light with good penetrability and emit ultraviolet or visible light to induce the decomposition of free radicals or ionic photoinitiators. The other components in the composition act synergistically to realize the photopolymerization of the dark color composition, thereby increasing the photopolymerization depth of the dark-colored materials. At the same time, the interaction between melanin and other components can also act as a physical cross-linking point and improve the mechanical properties of the polymer.

DESCRIPTION OF PREFERRED EMBODIMENTS

The present invention will be described in detail in combination with the drawings and the embodiments.

Figure 1:
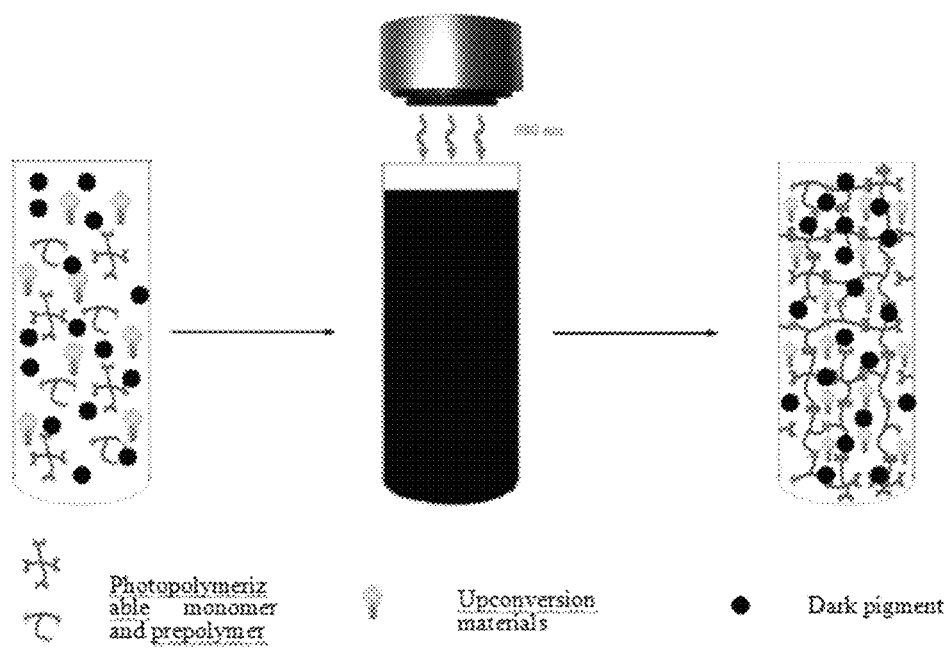
FIG. 1 is a schematic diagram of the photopolymerization of the composition of the invention.

As shown in FIG. 1, the photopolymerizable prepolymer, monomer, photoinitiator, melanin and up conversion material are evenly mixed and then put into the test tube. After near-infrared light irradiation, melanin can avoid the absorption of melanin, and can be absorbed by up conversion material and emit ultraviolet or visible light, so as to promote the photoinitiator to decompose and induce the light-emitting polymerization reaction to obtain the final cross-linking product. Melanin synthesis: 180 mg dopamine hydrochloride was dissolved in 90 mL deionized water. At 50° C., 760 μL1 mol/L NaOH solution was added to the above solution. The color of the solution changes to light yellow and gradually turns to dark brown. After aging for 5 hours, the melanin like nanoparticles were recovered by centrifugation at 18000 rpm, washed three times with deionized water and dried. The structure is as follows:

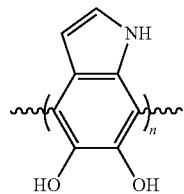

The range of n is 50-400

Example 1 the invention relates to a composition for realizing deep photopolymerization of black system Polyurethane acrylate 75 phr,
Trimethylolpropane triacrylate 20 phr,
Bis(2,6-difluoro-3-pyrrolyl)phenyl titanocene, 3 phr,
Melanin 0.1 phr,
Upconversion materials $NaYF_4$ 2 phr.

Figure 2:
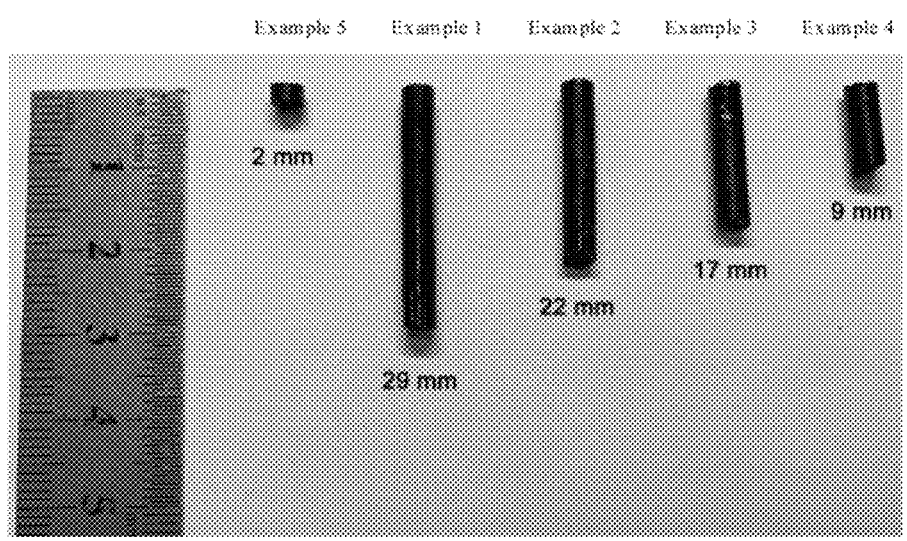
FIG. 2 shows the curing depth of examples 1-4 and comparison example 5 of the present invention.
Figure 3:
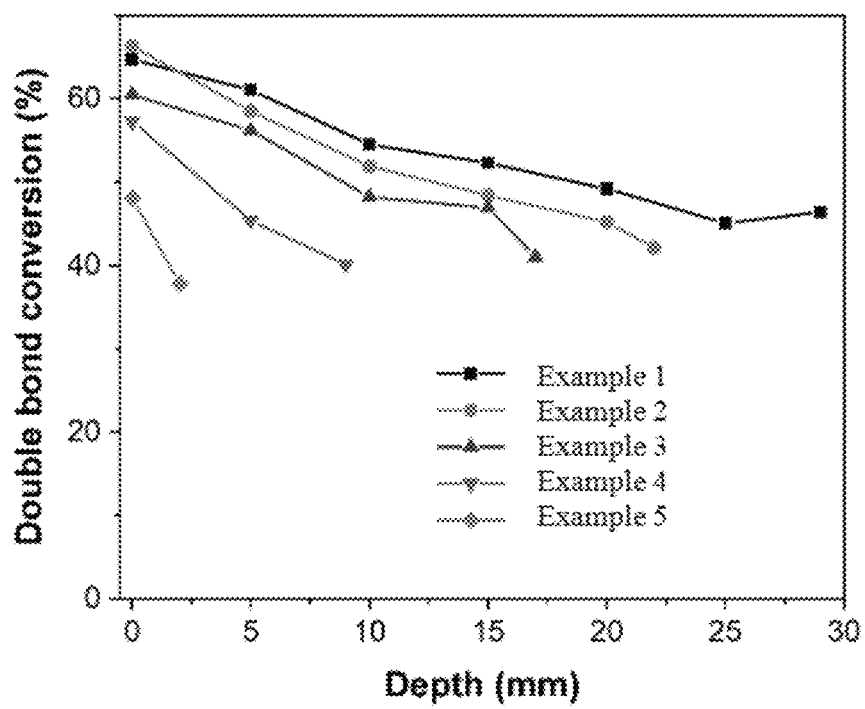
FIG. 3 is the test data curve of embodiment 1-4 and comparison example 5 of the present invention.
Figure 4:
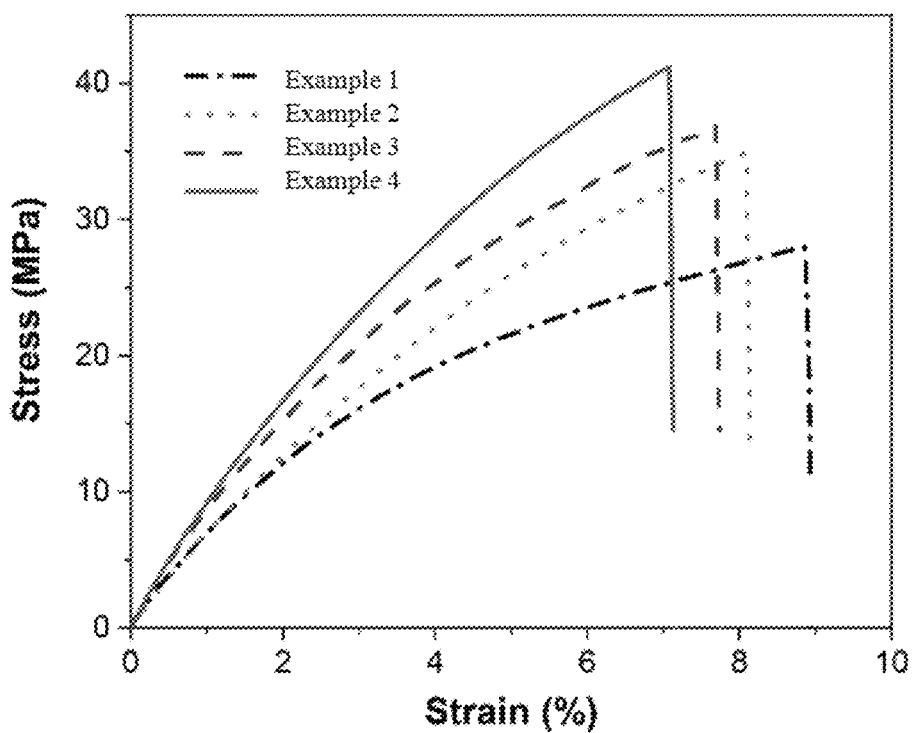
FIG. 4 is the test curve of embodiments 1-4 of the present invention.

The above composition is mixed and evenly added into the test tube, and then placed vertically, the light source with emission wavelength of 980 nm and energy density of 10 W/cm2 is used to irradiate the top of the test tube downward, and a certain length of column is obtained after 5 minutes of curing. When the melanin content is 0.1 phr, the test results are shown in FIG. 2, the length of the column is 29 mm, and the double bond conversion is shown in FIG. 3, which is about 60%. The tensile spline prepared by the composition is tested by mechanics, and the tensile strength is about 27 MPa as shown in FIG. 4.

Example 2

A composition for realizing deep photopolymerization of black system, the composition contains components and the mass fraction of each component is the same as that in example 1, the difference is that the content of melanin is changed to 0.3 phr, the length of column obtained under the same light conditions is 22 mm as shown in FIG. 2, and the double bond conversion is about 56% as shown in FIG. 3. The tensile spline prepared by the composition is tested by mechanics, and the tensile strength is about 34 MPa as shown in FIG. 4.

Example 3

A composition for realizing deep photopolymerization of black system, the composition contains components and the mass fraction of each component is the same as that in example 1, the difference is that the content of melanin is changed to 0.5 phr, the length of column obtained under the same light conditions is 17 mm as shown in FIG. 2, and the double bond conversion is about 52% as shown in FIG. 3. The tensile spline prepared by the composition is tested by mechanics, and the tensile strength is about 36 MPa as shown in FIG. 4.

Example 4

A composition for realizing deep photopolymerization of black system, the composition contains components and the mass fraction of each component is the same as that in example 1, the difference is that the content of melanin is changed to 1 phr, the length of the column obtained under the same light conditions is 9 mm as shown in FIG. 2, and the double bond conversion rate is about 45% as shown in FIG. 3. The tensile spline prepared by the composition is tested by mechanics, and the tensile strength is about 41 MPa as shown in FIG. 4.

Therefore, with the increase of melanin content, due to the hydrogen bond between melanin and sample, the tensile strength of melanin as a physical cross-linking point increases gradually.

Example 5

The composition comprises the following components and the mass fraction of each component:
75 phr polyurethane acrylate,
Trimethylolpropane triacrylate 20 phr,
Bis(2,6-difluoro-3-pyrrolyl)phenyl titanocene, 3 phr, Carbon black 0.1 phr,
Upconversion materials NaYF$_4$ 2 phr.

The above composition is evenly mixed and added into the test tube. After it is placed vertically, a light source with emission wavelength of 980 nm and energy density of 10 W/cm2 is used to irradiate the top of the test tube downward. After 5 minutes, a certain length of column is obtained by curing. When the carbon black content is 0.1 phr, the test results are shown in FIG. 2. The length of the column is 2 mm, and the double bond conversion is about 40% as shown in FIG. 3.

Therefore, the barrier ability of carbon black to NIR is higher than that of melanin, which makes NIR difficult to penetrate the sample, the curing depth is limited, and the conversion is lower than that of melanin.

Example 6

The invention relates to a composition for realizing deep photopolymerization of black system
Epoxy acrylate 60 phr,
Pentaerythritol triacrylate 30 phr,
2,4,6-Trimethylbenzoyldiphenylphosphine oxide, 8 phr,
Melanin 2 phr,
Upconversion materials BaYF$_5$ 0.05 phr.

The composition is evenly mixed, and a 200 micron coating is coated on the surface of the iron plate with a coating coater. The light source with an emission wavelength of 1000 nm and an energy density of 15 W/cm$^2$ is used to irradiate the coating, and the coating is cured after 1 minute. The conversion rate of the bottom double bond is more than 65%, and the hardness of the coating is 4H.

Example 7

A composition for realizing deep-layer photopolymerization of a black system, the components contained in the composition and the mass parts of each component are:
Epoxy resin 50 phr,
3,4-epoxycyclohexylmethyl-3,4-epoxycyclohexylcarboxylate 40 phr,
4,4'-dimethyldiphenyl iodonium salt hexafluorophosphate 3 phr,
Melanin 5 phr,
Upconversion materials NaGdF$_4$ 2 phr.

Mix the above composition uniformly, use a paint film coater to coat a 200-micron coating on the surface of the iron plate, irradiate it with a light source with an emission wavelength of 980 nm and an energy density of 8 W/cm2, and cure after 0.5 minutes. The double bond conversion rate is greater than 60%, and the paint film hardness is 5H.

Example 8

A composition for realizing deep-layer photopolymerization of a black system, the components contained in the composition and the mass parts of each component are:
Epoxy resin 70 phr,
3,4-epoxycyclohexylmethyl-3,4-epoxycyclohexyl 20 phr,
4,4'-dimethyldiphenyl iodonium salt hexafluorophosphate 8 phr,
Melanin 2 phr,
Upconversion materials LiYF$_4$ 0.05 phr.

Mix the above composition uniformly, use a paint film coater to coat a 200-micron coating on the surface of the iron plate, irradiate it with a light source with an emission wavelength of 1000 nm and an energy density of 1 W/cm2, and cure after 5 minutes. The double bond conversion of the bottom layer is greater than 60%, and the paint film hardness is 2H.

What is claimed is:

1. A dark system photopolymerization composition, comprising:
   photopolymerizable prepolymer 20-80 phr;
   photopolymerizable monomer 5-60 phr;
   photoinitiator 2-8 phr;
   dark pigment 0.1 or 0.3 or 0.5 phr; and
   upconversion materials 0.05-5 phr,
   wherein:
   the photoinitiator is bis 2,6-difluoro-3-pyrrole phenyl titanocene;
   the dark pigment comprises at least one substance having the following structure:

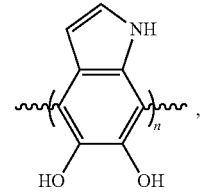

where the range of n is 50-400, and the range of m is 50-400.

2. The dark system photopolymerizable composition according to claim 1, wherein the photopolymerizable prepolymer and/or the photopolymerizable monomer have a polar group, and the polar group is selected from the group consisting of hydroxyl and amino.

3. The dark system photopolymerizable composition according to claim 1, wherein the photopolymerizable prepolymer comprises one or more of polyurethane acrylate, epoxy acrylate, polyester acrylate, and amino acrylic esters.

4. The dark system photopolymerizable composition according to claim 1, wherein the photopolymerizable monomer is selected from the group consisting of monofunctional acrylate monomers, bifunctional acrylate monomers, multifunctional acrylate monomers, ester ring epoxy monomers, oxetane monomers, and combinations thereof.

5. The dark system photopolymerizable composition according to claim 1, wherein the upconversion material is selected from the group consisting of of NaYF4, BaYF5, NaGdF4, LiYF4, NaYbF4, Na3ScF6, YF3, GdOF, and combinations thereof.

6. A method of making a dark-colored crosslinked polymer comprising polymerizing the dark-colored photopolymerization composition according to claim 1 under near-infrared light irradiation.

7. The method according to claim 6, wherein the wavelength of the near-infrared light is 800-1100 nm; the energy density of the near-infrared light is greater than 1 W/cm$^2$, less than 20 W/cm$^2$.

8. The dark system photopolymerizable composition according to claim 1, wherein the photopolymerizable prepolymer comprises one or more of polyurethane acrylate and epoxy acrylate.

9. The dark system photopolymerizable composition according to claim 1, wherein the photopolymerizable monomer is selected from the group consisting of isobornyl acrylate, neopentyl glycol diacrylate, dipentaerythritol hexaacrylate, 1-vinyl-2-pyrrolidone, tetrahydrofuran acrylate, o-phenylphenoxyethyl acrylate, 1,6-hexanediol diacrylate, trimethylolpropane triacrylate, pentaerythritol triacrylate, 3,4-epoxycyclohexylmethyl-3,4-epoxycyclohexyl formate, and combinations thereof.

\* \* \* \* \*